United States Patent [19]

Colin et al.

[11] Patent Number: 4,568,145

[45] Date of Patent: Feb. 4, 1986

[54] CONNECTION DEVICE FOR A CABLE INCORPORATING OPTICAL FIBERS AND METAL CONDUCTORS

[75] Inventors: Gérard Colin, Epinay sur Seine; Christian Kerduel, Conflans Sainte Honorine, both of France

[73] Assignee: Les Cables de Lyon, Clichy, France

[21] Appl. No.: 678,362

[22] Filed: Dec. 4, 1984

Related U.S. Application Data

[63] Continuation of Ser. No. 411,120, Aug. 24, 1982.

[30] Foreign Application Priority Data

Aug. 26, 1981 [FR] France .................. 81 16292

[51] Int. Cl.⁴ .................. G02B 6/36; H01R 41/00
[52] U.S. Cl. ............... 350/96.20; 350/96.21; 339/9 RY
[58] Field of Search ............. 350/96.20, 96.21, 96.22; 339/9 RY

[56] References Cited

U.S. PATENT DOCUMENTS

| 4,124,272 | 11/1978 | Henderson et al. | 350/96.21 |
| 4,295,707 | 10/1981 | Nakai et al. | 350/96.20 |
| 4,396,248 | 8/1983 | Bientz et al. | 350/96.21 |
| 4,427,879 | 1/1984 | Becher et al. | 350/96.20 |

OTHER PUBLICATIONS

"A Fiber Optic Rotational Coupler", J. A. Henderson et al., 27th Electronic Components Conference May 16-18, 1977, Arlington, U.S.A, pp. 557-560 and FIG. 6.

Primary Examiner—William L. Sikes
Assistant Examiner—Akm E. Ullah
Attorney, Agent, or Firm—Sughrue, Mion, Zinn, Macpeak and Seas

[57] ABSTRACT

A connection device for a cable incorporating optical fibres and metal conductors. A connection device for a cable incorporating both optical fibres (10) and metal conductors (34), comprising (a) a socket including a barrel with male electrical connection members (25), a ferrule containing the optical fibres (28) and an angular position defining device (29), and (b) a connector including a barrel with female electrical connection members (6), a ferrule containing the optical fibres (9) and an angular position defining device. The connector and/or socket are connected to a body (2) joined to the end of a cable and comprising means (30, 31, 32, 33) permitting relative rotation of the connector and/or socket relative to the end of the corresponding cable.

4 Claims, 3 Drawing Figures

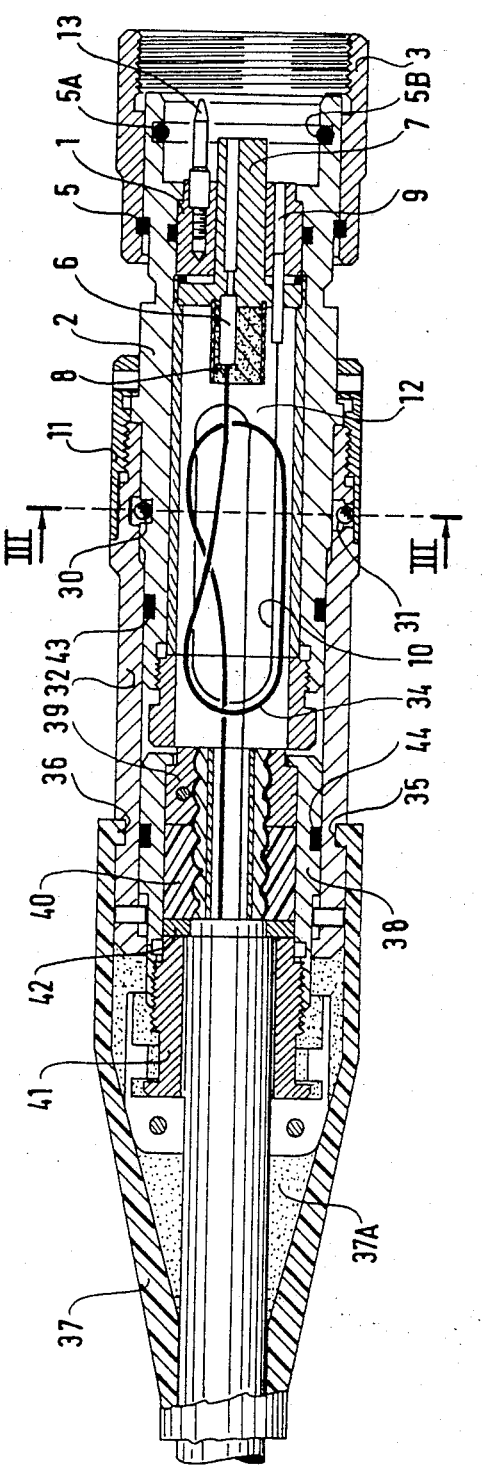
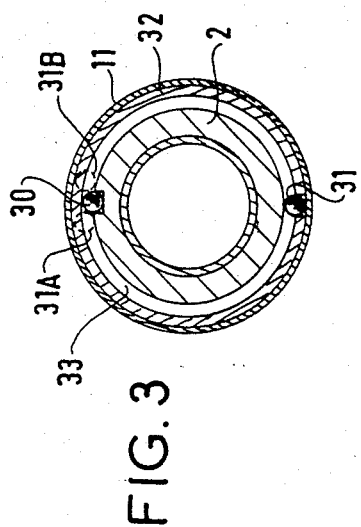
FIG. 2
FIG. 3

CONNECTION DEVICE FOR A CABLE INCORPORATING OPTICAL FIBERS AND METAL CONDUCTORS

This is a continuation of application Ser. No. 411,120, filed Aug. 24, 1982.

FIELD OF THE INVENTION

The present invention concerns a connection device for a cable incorporating both optical fibres and metal conductors, comprising (a) a socket including a barrel with male electrical connection members, a ferrule containing the optical fibres and an angular position defining device, and (b) a connector including a barrel with female electrical connection members, a ferrule containing the optical fibres and an angular position defining device.

BACKGROUND OF THE INVENTION

The problem of connecting a cable incorporating both optical fibres and metal conductors, in particular for the transmission of a supply of electrical power to the repeaters of submarine cables, either to another cable or to a connecting cable of a repeater, is of relatively recent origin and has not as yet received a satisfactory solution. Torsion tends to occur at such connections, resulting from the fact that the cable cannot rotate about its axis and likely to damage the cable sheath or the envelope of the connection device and to allow the ingress of water into the cable or the connection.

The present invention provides in particular for overcoming these disadvantages. It has for its objective the provision of a device which effects simultaneous connection by means of a single mechanical assembly between cables or between a cable and a connecting cable of a repeater, with a certain freedom of rotation.

SUMMARY OF THE INVENTION

The connection device in accordance with the invention is characterised in that the connector and/or socket are connected to a body joined to the end of a cable and comprising means permitting relative rotation of the connector and/or socket relative to the end of the corresponding cable.

The invention preferably further consists in at least one of the following characteristics:

The means permitting relative rotation are disposed so that said rotation is close to 360°.

The means permitting relative rotation comprise a ball disposed in a cavity in an inner body and a ball disposed in a cavity in an outer shroud able to turn on the inner body, both said balls penetrating into a circumferential groove separating said inner body and said outer shroud.

The body comprises an internal cavity accommodating excess lengths of optical fibres and conductors corresponding at least to the maximum relative rotation provided for.

The end of the outer shroud closest to the cable is connected to the cable sheath by an elastic sleeve surrounding a space filled with a viscous liquid.

A device in accordance with the invention for connecting a cable with two optical fibres and two electrical conductors to a repeater will be described hereinafter by way of example only and with reference to the accompanying drawings.

BRIEF DESCRIPTION OF THE DRAWINGS

FIG. 2 is a diametral cross-section through the cable connector with its device permitting relative rotation of the connector relative to the end of the cable.

FIG. 3 is a transverse cross-section on the line III—III in FIG. 2 showing the operation of the system of balls limiting relative rotation.

DESCRIPTION OF THE PREFERRED EMBODIMENT

Figure 1:
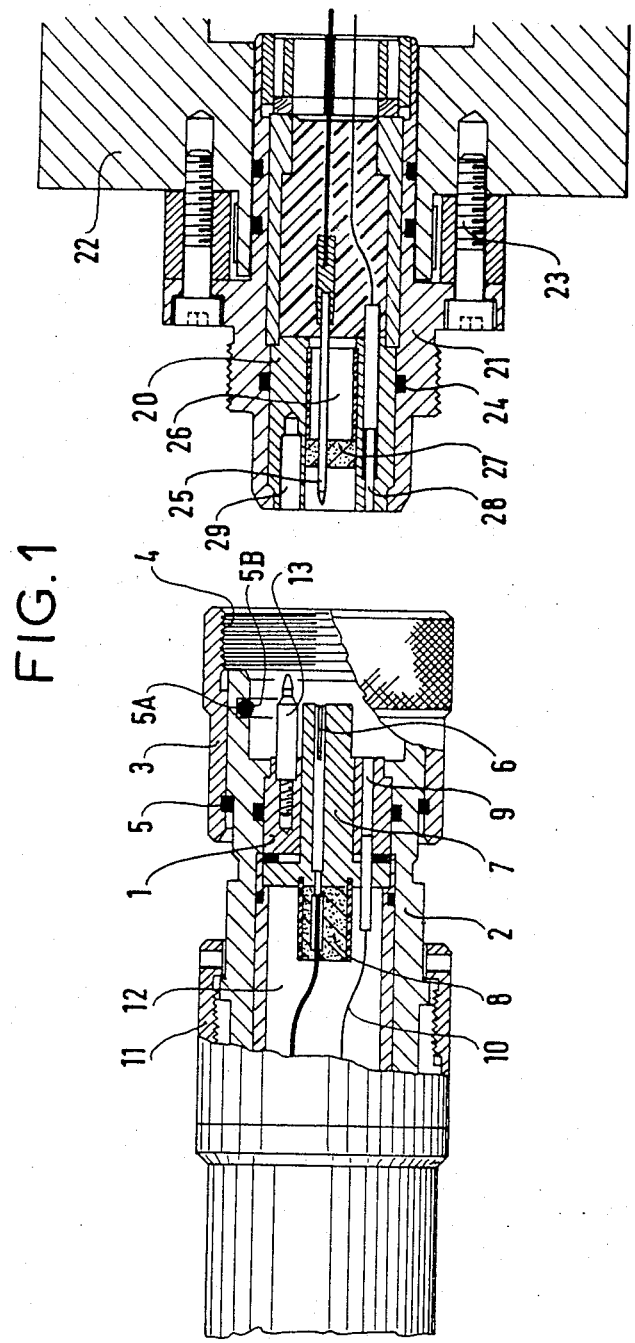
FIG. 1 shows in diametral cross-section and separated from one another the barrel of the cable connector and the barrel of the repeater socket.

In FIG. 1, the barrel 1 of the connector proper is disposed in a connector body 2 on which is mounted a coupling nut 3 with thread 4 and an internal groove housing a seal 5. The connector body has around its internal perimeter a groove 5A in which is disposed a seal 5B. The electrical continuity socket member 6 is disposed in an insulator 7 beyond insulating bush 8. Cylindrical ferrule 9 forms a conduit for optical fibre 10. Nut 11 is used to attach to the connector body 2 the outer shroud of the connector (see FIG. 2). At the rear of insulator 7 is an internal cavity 12 designed to accommodate excess lengths of optical fibres and electrical conductors. The barrel is fitted with a polarising pin 13.

The barrel of the socket 20 is surrounded by a socket body 21 fixed to the connector casing 22 by bolts 23 and formed with an annular groove housing a seal 24. The electrical continuity pin 25 is mounted on the glass bead 26 and seal 27. Cylindrical ferrule 28 permits the passage of an optical fibre. A blind hole 29 forms a polarising member for angular positioning, in liaison with the aforementioned pin 13.

FIGS. 2 and 3 show the part of the connection device controlling its orientation.

A first ball 30 is disposed in a cavity in connector body 2. A second ball 31 is disposed in a cavity in an outer shroud 32 of the connector, which is able to rotate about the connector body. Both these balls project into an annular space 33. It will be seen that the freedom of the outer shroud to rotate is limited only by ball 31 abutting against ball 30, either from the left (position 31A) or from the right (position 31B). The degree of relative rotation permitted is thus slightly less than 360°.

The excess lengths of optical fibres as 10 and electrical conductors as 34 in internal cavity 12 enable same to adapt to relative rotation of the connector body relative to the outer shroud which is fastened to the end of the cable.

The rear part of shroud 32 comprises an annular groove 35 in which engages an annular rib 36 on an elastomer sleeve 37 surrounding the end of the cable. This end of the cable is maintained within shroud 32 by means of a retaining member 38 equipped with a retaining ring 39 and gland seal 40 surrounding the cable sheath, the gland being compressed by nut 41 and washer 42. The space 37A inside sleeve 37 around nut 41 is filled with a high-viscosity liquid such as highly viscous vaseline, polybutene or polyisobutene.

Further seals 43 between the connector body and outer shroud and 44 between the outer shroud and retaining member complete the sealing of the connection device.

Although the connection device which has been described with reference to the drawings would appear to be the preferred embodiment of the invention, it will be appreciated that various modifications may be made thereto without departing from the scope of the invention, certain of its component parts being replacable by others having an analogous technical function.

We claim:

1. In a connection device for connecting first and second cable ends incorporating both optical fibers (10) and metal conductors (34), said device comprising:
   (a) a socket member including a barrel with male electrical connection members (25), a ferrule containing the optical fibres (10) and an angular position defining device (29), and
   (b) a connector member including a barrel with female electrical connection members (6), a ferrule containing the optical fibres (10) and an angular position defining device,
   the improvement wherein one of the connector member and the socket member includes a shroud fixedly coupled to said first cable end a body (2) rotatably mounted to said shroud, and means (30, 31, 32 33) for limiting rotation of said body relative to said shroud to close to 360°, and said device further comprising means for fixedly coupling said socket member to said connector member to effect a low decibel transmission loss between said optical fibers, and the other of said connector member and socket member being fixedly connected to said second cable end.

2. A device according to claim 1, wherein said body comprises an inner body (2), wherein said shroud comprises an outer shroud (32), said outer shroud encompassing said inner body, and wherein said relative rotation limiting means comprises a ball (30) disposed in a cavity in said inner body (2) and a ball (31) disposed in a coplanar cavity in said outer shroud (32), said outer shroud being turnable on said inner body, and wherein both said balls partially penetrate into a common circumferential space (33) separating said inner body and said outer shroud, such that rotation of said inner body relative to said outer shroud is limited in either direction by contact between the balls (30, 31) as they move within said common circumferential space (33).

3. A device according to claim 2, wherein the end of the outer shroud closest the cable is connected to the cable sheath by an elastic sleeve (37) surrounding a space (37A) filled with a viscous liquid.

4. A device according to claim 3, wherein the body (2) comprises means defining an internal cavity (12) accommodating excess lengths of optical fibres and conductors corresponding at least to the relative rotation provided for.

* * * * *